United States Patent [19]
Onoda et al.

[11] Patent Number: 4,682,902
[45] Date of Patent: Jul. 28, 1987

[54] WRITING PLOTTING APPARATUS WITH KEYBOARD

[75] Inventors: Hiroshi Onoda; Kenji Mizuno, both of Nagoya, Japan

[73] Assignee: Brother Kogyo Kabushiki Kaisha, Aichi, Japan

[21] Appl. No.: 827,198

[22] Filed: Feb. 7, 1986

Related U.S. Application Data

[63] Continuation of Ser. No. 675,287, Nov. 27, 1984, abandoned.

[30] Foreign Application Priority Data

Nov. 30, 1983 [JP] Japan .................. 58-225838
Nov. 30, 1983 [JP] Japan .................. 58-225839

[51] Int. Cl.⁴ ............................. B41J 3/04
[52] U.S. Cl. ........................... 400/18; 400/65; 340/747
[58] Field of Search .................. 400/16–18, 400/65, 171, 19; 368/70; 340/747, 790

[56] References Cited

U.S. PATENT DOCUMENTS

| 3,996,584 | 12/1976 | Plager ............... 340/790 |
| 4,141,208 | 2/1979 | Whipple et al. ........ 368/70 |
| 4,150,902 | 4/1979 | Brescia .............. 400/17 |
| 4,281,938 | 8/1981 | Phillips ............. 400/171 |
| 4,375,079 | 2/1983 | Ricketts et al. ...... 340/747 |
| 4,527,918 | 7/1985 | Yamamoto et al. ...... 400/17 |

FOREIGN PATENT DOCUMENTS

| 1158588 | 12/1983 | Canada ............... 400/17 |
| 22397 | 1/1981 | European Pat. Off. ... 400/82 |
| 2835633 | 2/1980 | Fed. Rep. of Germany .. 400/65 |
| 89966 | 6/1982 | Japan ................ 400/18 |
| 39569 | 3/1984 | Japan ................ 400/82 |
| 2084365 | 4/1982 | United Kingdom ....... 400/16 |

OTHER PUBLICATIONS

Grubb, "Alphanumeric Character Set", IBM Technical Disclosure Bulletin, vol. 22, No. 7, p. 2610, 12/79.
Herrold, "Printer and/or Display . . . Forming Lines", IBM Technical Disclosure Bulletin, vol. 22, No. 4, pp. 1340–1343, 9/79.

Primary Examiner—William Pieprz
Attorney, Agent, or Firm—Parkhurst & Oliff

[57] ABSTRACT

A writing-plotting apparatus comprising a keyboard including a mode selector for selecting a writing or plotting mode, a carriage carrying a pen movably toward and away from a sheet of paper, a first memory for storing character pattern data representative of characters, a second memory for storing graphic pattern data representative of patterns of graphs, and a control device which, in the writing mode, reads out from the first memory the character pattern data corresponding to the operated character keys, and in the plotting mode reads out from the second memory the graphic pattern data. The control device is responsive to the read-out character or graphic pattern data and controls the operations of drives for feeding the paper along one axis, reciprocating the carriage along another axis perpendicular to the one axis, and moving the pen for contact and release with respect to the paper. The apparatus may comprise a converter which receives drive signals corresponding to the read-out data and converts the signals based on a desired size of the characters or graphs selected by a size selector, so that the converted drive signals are applied to the paper, carriage and pen drives.

14 Claims, 13 Drawing Figures

S101: END FLAG REGISTER SET TO "1" ?

S103: LAST BYTE OF THE CHARACTER PATTERN DATA?

S105: PEN-CONTACT/RELEASE DATA ?

S201: GRAPHIC PATTERN SELECTION DATA ?
S203: ANY NUMERAL KEY ?
S205: CARRIAGE RETURN (ENTER) KEY ?
S210: ALL GRAPH MEMORY CONTENTS PRESENTED IN GRAPH ?
S212: PERCENT INDICATION REQUIRED ?

WRITING PLOTTING APPARATUS WITH KEYBOARD

This is a continuation of application Ser. No. 675,287, filed Nov. 27, 1984, now abandoned.

BACKGROUND OF THE INVENTION

The present invention relates to a recording apparatus for writing characters or plotting graphs on a recording medium with ball-point pens or similar writing instruments, by means of relative movements of a carriage carrying the writing instruments relative to the recording medium supported on a suitable support, and by controlling the movements of the writing instruments toward and away from the recording medium for contact and release of the instruments relative to the surface of the recording medium.

A recording apparatus is known, wherein the recording on a sheet of paper is achieved by relative movements of the recording sheet and a writing instrument as indicated above. Such a known recording apparatus is designed for plotting graphs or writing other graphical representations, but not capable of writing characters such as letters, numerals and symbols which are entered through a keyboard by operating the appropriate character keys.

Further, it is known to change the size of graphs to be plotted on such a recording apparatus. However, the change requires a special program to be prepared and stored in a memory of the apparatus.

SUMMARY OF THE INVENTION

It is therefore an object of the present invention to provide a recording apparatus with a keyboard, which is operable either in a writing mode in which desired characters are recorded, as in an ordinary typewriter, by operating the corresponding character keys on the keyboard, or in a plotting mode in which graphs are drawn, such that the writing and plotting modes are selectable with a simple manipulation of a mode selector key.

According to the invention, there is provided a recording apparatus, comprising: (a) a keyboard having character keys corresponding to characters, function keys, and a mode selecting means for selecting one of a typing mode and a plotting mode; (b) a paper support member for supporting a sheet of paper; (c) a paper feeding device for feeding the sheet of paper in one of opposite directions; (d) a carriage supporting a writing instrument, and movable in a direction perpendicular to a line of feed of the sheet of paper; (e) a carriage driving device for reciprocating the carriage in said direction perpendicular to the line of feed of the paper; (f) a writing-instrument driving device for moving the writing instrument between a first position in which the writing instrument is in contact with the sheet of paper, and a second position in which the writing instrument is held away from the sheet of paper; (g) a character pattern memory for storing sets of character pattern data representative of patterns of the individual characters; (h) a graphic pattern memory for storing at least one set of graphic pattern data representative of a graphic pattern such as a bar graph, a broken-line graph or a circular graph (pie chart); and (i) control means which, in the typing mode, reads out from the character pattern memory the sets of character pattern data corresponding to the character keys operated, and in the plotting mode, reads out from the graphic pattern memory said graphic pattern data, the control means being responsive to the read-out character and graphic pattern data and controlling the operations of the paper feeding device, carriage driving device and writing-instrument driving device.

In the recording apparatus constructed as described above, the operation of a desired character key on the keyboard in the writing mode will cause the corresponding character code to be generated, as in an ordinary typewriter. The control means reads out from the character pattern memory the corresponding set of character pattern data, and controls the operations of the paper feeding device, carriage driving device and writing-instrument driving device, based on the read-out character pattern data, so that the character represented by the pattern data is written on the sheet of paper.

When the plotting or graphic mode is selected by the mode selector, the control means reads out from the graphic pattern memory the set of graphic pattern data corresponding to a desired graphic pattern, and controls the operations of the paper feeding device, carriage driving device and writing-instrument driving device, based on the read-out pattern data and on numeric data entered through the numeric character keys on the keyboard, so that the desired graph is plotted on the sheet of paper.

As discussed above, the recording apparatus according to the present invention is capable of both writing and plotting, i.e., capable of easily preparing a document containing both characters, words or sentences, and graphs, illustrations or other graphic representations.

The mode selecting means may be a single alternate-action key or two-position selector switch on the keyboard. In the former instance, the selector key selects the writing and plotting mode alternately upon repeated depression thereof. In a preferred form of the invention, the apparatus comprises a mode flag register, the content of which is switched between two predetermined states alternately each time the selector key or switch is operated.

According to an advantageous embodiment of the invention, the recording apparatus further comprises converter means, and the keyboard provides size selecting means for determining a size of the characters and graphs inscribed by the writing instrument. The converter means is adapted to receive from the control means drive signals corresponding to the read-out character or graphic pattern data, and converts the drive signals into converted drive signals based on the size determined by the size selecting means. The paper feeding and carriage driving devices are operated based on the converted drive signals supplied from the convertor means.

In the above embodiment, the size of the characters written in the writing mode and the size of the graphs plotted in the plotting mode are readily changed with the size selecting means, which may be a single selector key having plural positions that are selected in sequence by repeated depression of the key, or which may be a selector switch having plural positions. In either case, the plural positions correspond to different sizes of the character or graph. In a preferred form of the invention, the apparatus comprises a size flag register, the content of which is changed from one of plural predetermined states to another in sequence when the plural positions of the size selector key or switch are selected.

In the case where the converter means is provided according to the above-indicated advantageous embodiment, each set of character pattern data may comprise vector data representative of each element of each character as a vector which has a magnitude and a direction, and pen-contact/release data for contact and release of the writing instrument with respect to the paper. In this instance, it is appreciated that the converter means converts the drive signals to the converted drive signals by multiplying the magnitude of the vector by one of plural predetermined values which is determined by the size determined by the size selecting means. In this case, one of the predetermined values corresponds to a standard size of the characters and graphs. Alternatively, it is possible that the size selecting means has a standard position corresponding to a standard size of the characters and graph, and that the converter means does not convert the drive signals when the size selecting means is placed in the standard position, but converts the drive signals to said converted drive signals when the selecting means is placed in a position other than the standard position. In the conversion, the converter means multiplies the magnitude of the vector of the vector data of the character pattern data, by a value which is determined by the position in which the selecting means is placed.

According to a further advantageous embodiment, the keyboard comprises a vector direction key for changing a posture of the characters from a standard posture thereof defined by the character pattern data stored in the character pattern memory. In this case, another converter means is provided for converting the direction of the vector according to the operation of the vector direction key.

BRIEF DESCRIPTION OF THE DRAWINGS

The above and other objects, features and advantages of the present invention will become more apparent from reading the following description of a preferred embodiment taken in connection with the accompanying drawing in which.

DETAILED DESCRIPTION OF THE PREFERRED EMBODIMENT

Referring to the accompanying drawing, a preferred embodiment of the invention will be described in detail.

Figure 1:
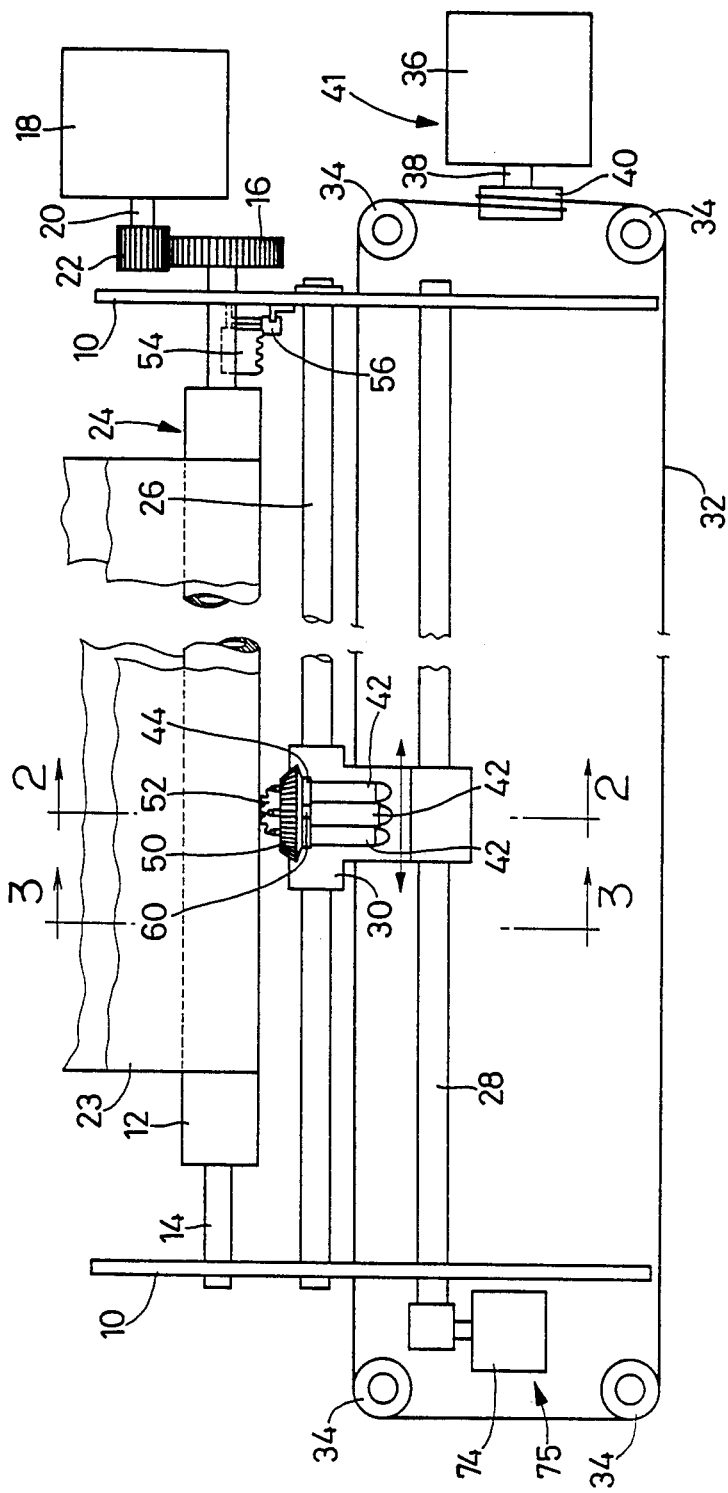
FIG. 1 is a schematic plan view of a recording mechanism of one embodiment of a recording apparatus of the invention.

There is shown in FIGS. 1-4 a mechanical arrangement of a recording apparatus using ball-point pens in one form of the present invention. In FIG. 1, reference numeral 10 designates a pair of opposed side frames of a main housing structure of the apparatus. These side frames 10 support rotatably a shaft 14 of a platen 12 which serves as a paper support member. The shaft 14 has a gear 16 fixed to one end thereof. The gear 16 meshes with a pinion 22 which is fixed to an output shaft 20 of a platen drive motor 18 which may be a stepping motor or a DC servomotor. The platen 12 is rotated by an angular amount as needed by the motor 18 in a selected one of opposite directions, i.e., either forward or reverse direction. Thus, the platen 12, gear 16, pinion 22 and motor 18 constitute a major part of a paper feeding device 24 for feeding a record medium in the form of a sheet of paper 23 in the Y-axis direction perpendicular to an axis of rotation of the platen 12.

Figure 2:
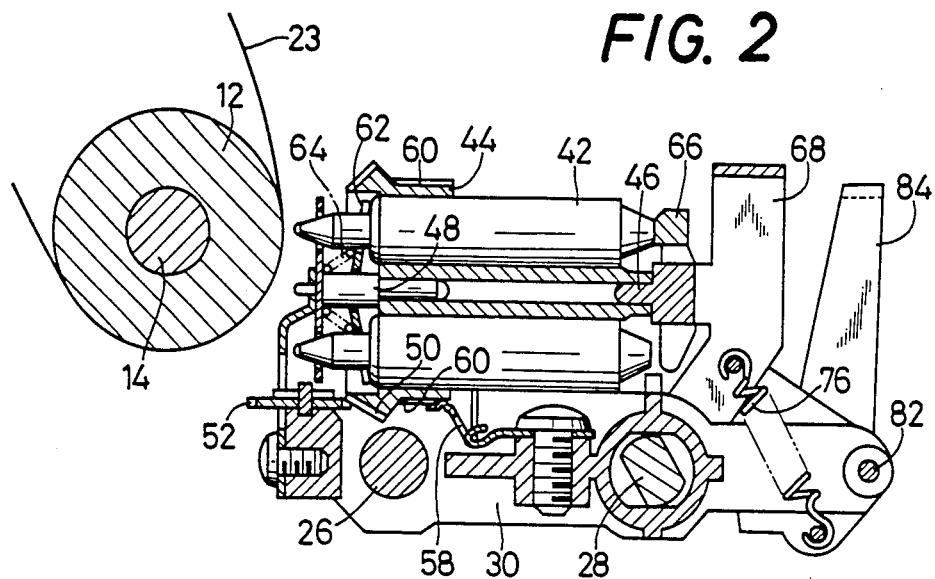
FIG. 2 is an elevational view in cross section of the apparatus taken along line 2—2 of FIG. 1.

Two mutually parallel guide rods 26, 28 are disposed in parallel with the platen 12. As shown in FIG. 2, the guide rod 26 is of circular shape in transverse cross section and supported at its opposite ends by the side frames 10, while the guide rod 28 is of double-D shape (flatted round broach shape) in transverse cross section. More precisely, the rod 28 is prepared from a round bar by cutting so as to provide a cross sectional shape defined by two parallel straight lines and circular arcs passing the opposite ends of the straight lines. A carriage 30 is slidably supported by these two guide rods 26, 28. A carriage drive wire 32 is guided, generally in a loop, by four idler guide rollers 34 and fixed at its ends to the carriage 30. The drive wire 32 is wound on a driven pulley 40 fixed to an output shaft 38 of a carriage drive motor 36, which may be a stepping motor or a DC servomotor. With bidirectional rotary movements of the drive motor 36, the loop of the drive wire 32 is rotated in the corresponding directions, whereby the carriage 30 is reciprocated in opposite directions along the axis of the platen 12, i.e., in the X-axis direction perpendicular to the Y-axis along which the sheet of paper 23 is fed by the paper feeding device 24. Thus, the wire 32, guide rollers 34, carriage drive motor 36, etc. constitute a carriage driving device 41.

The carriage 30 carries a multi-station pen-holding head 44 which supports plural writing instruments, in this example, a set of four ball-point pens 42. The multi-station pen-holding head 44 is supported on the carriage 30 rotatably or indexably about its axis substantially perpendicular to the axis of the platen 12. Stated more particularly, the pen-holding head 44 is rotatably supported at its axial ends, by two shafts 46, 48 as shown in FIG. 2. The four ball-point pens 42, which are of different colors, are disposed in evenly spaced-apart relation with each other circumferentially of the pen-holding head 44, and supported so that the pens 42 are axially movable toward and away from the surface of the platen 12, independently of each other. The pen-holding head 44 is provided, at its front end adjacent to the platen 12, with an integrally formed bevel gear 50 which meshes with a pinion 52 supported on the carriage 30. As shown in FIG. 1, a stationary rack 54 is located adjacent to the right-hand side end of the platen 12. The pinion 52 is engageable with the rack 54 when the carriage 30 is moved to the right end of the platen 12, so that the pen-holding head 44 is indexed to bring the selected pen 42 in its writing position at which the axis of the pen 42 is substantially normal to the surface of the platen 12. The rack 54 is movable by a solenoid 56 between its operative position for engagement with the pinion 52, and its inoperative position in which the rack 54 is not engageable with the pinion 52. The four indexable positions of the pen-holding head 44 are accurately established, by means of elastic engagement of a pawl 58 on the carriage 30, with recesses 60 formed in the outer surface of the head 44.

While each of the pens 42 is normally held away from the surface of the platen 12 by a holder plate 62 and a spring 64, the pen 42, while placed in the writing position, is moved toward the platen 12 by a lever 66 against a biasing force of the spring 64 and brought into pressed contact with the surface of the sheet of paper 23. Described in more detail referring to FIG. 3, the lever 66 is pivotable about a pin 70 on another lever 68. The lever 66 is pivoted counterclockwise as viewed in Fig. 3, by a pivotal movement of a lever 72 which is supported by the guide rod 28 such that the lever 72 is slidable axially of the guide rod 28 but not rotatably relative to the rod 28. With a counterclockwise pivotal movement of the lever 66, the ball-point pen 42 in the writing position is pushed forward for contact with the sheet of paper 23. The lever 72 is pivoted by the guide rod 28 which is rotated through a predetermined angle by a solenoid 74 shown in FIG. 1. Thus, the holder plate 62, spring 64, levers 66 and 72, guide rod 28, solenoid 74, etc. constitute a pen driving device 75 for axially moving the selected pen 42 between its first position in which the front writing tip is in contact with the sheet of paper 23 supported on the platen 12, and its second position in which the front end is kept away from the sheet of paper 23.

Figure 3:
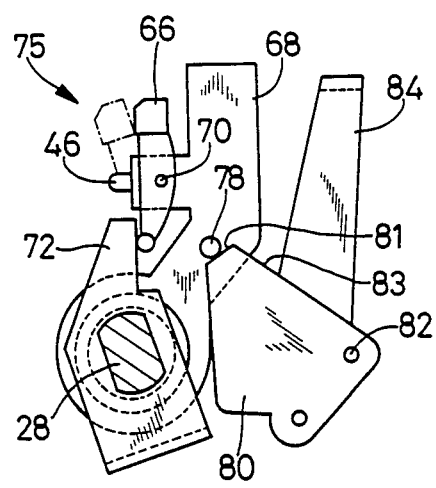
FIGS. 3 and 4 are fragmentary elevational views in cross section taken along line 3—3 of FIG. 1, respectively, showing two different operating positions.
Figure 4:
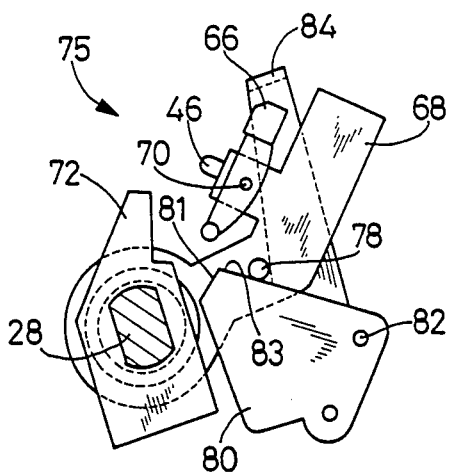

As depicted in FIGS. 2-4, the lever 68 is supported by the guide rod 28 pivotally about the axis of the rod 28, and biased by a spring 76 in a direction that causes the lever 68 to pivot away from the pen-holding head 44. The lever 68 biased by the spring 76 is held in one of two positions of FIGS. 3 and 4, by engagement of a pin 78 projecting from the lever 68, with a blocking plate 80 which is supported by the carriage 30 pivotally about a shaft 82. More specifically, with the pin 78 engaging a first face 81 of the blocking plate 80, the lever 68 is held in its upright position of FIG. 3 in which the pen-holding head 44 is indexably supported by the previously indicated shafts 46, 48. An operator-controlled lever 84 is secured to the blocking plate 80 to pivot the plate 80 about the shaft 82. When the lever 84 is pivoted counterclockwise as shown in FIG. 4, the blocking plate 80 is pivoted also counterclockwise, whereby the pin 78 on the lever 68 comes into engagement with a second face 83 of the plate 80. As a result, the lever 68 is pivoted clockwise to its inclined position of FIG. 4 in which the pen-holding head 44 is removable from the carriage 30.

Figure 5:
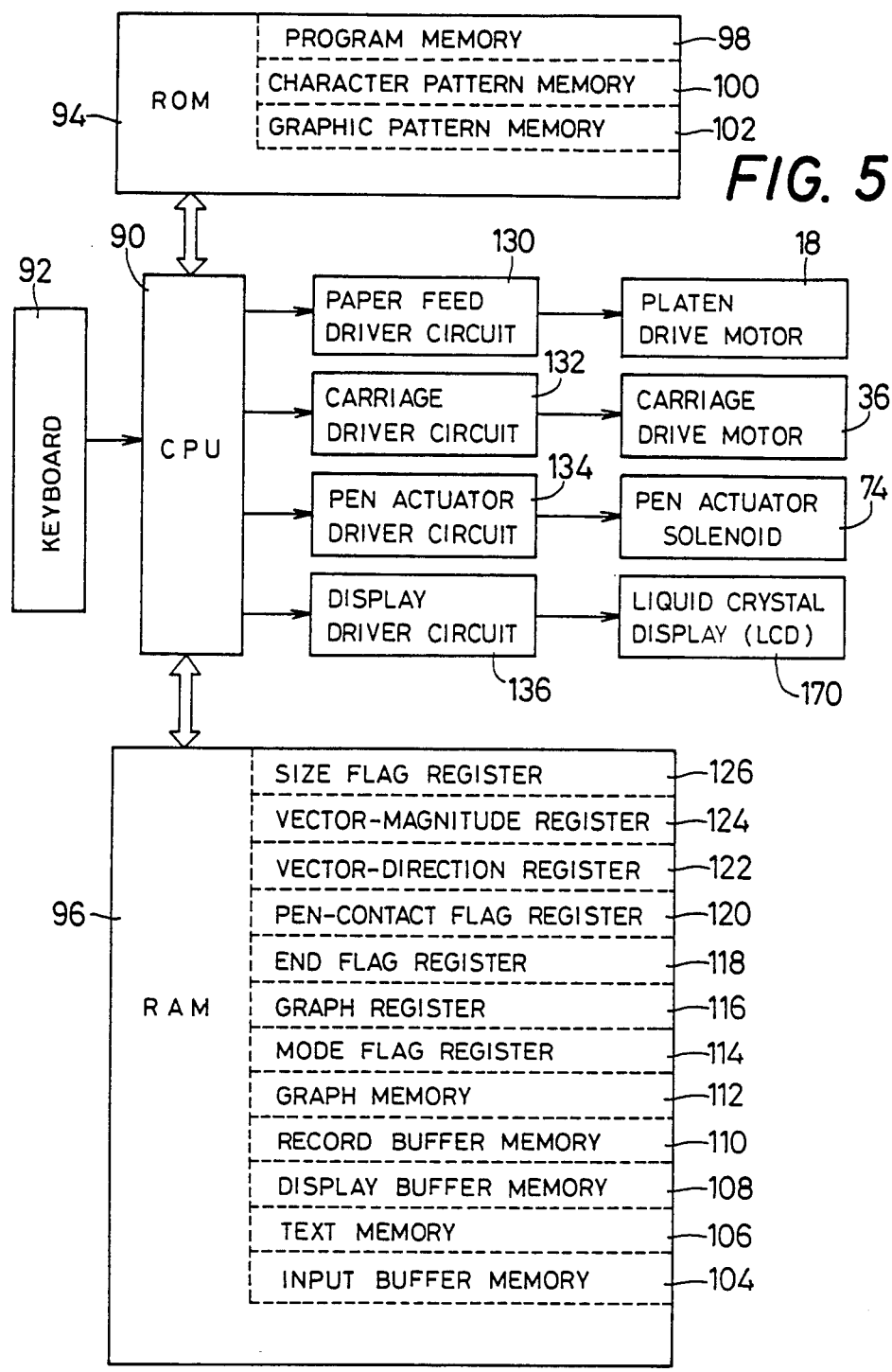
FIG. 5 is a block diagram of a control system for the recording apparatus of FIG. 1.

The recording mechanism with the construction which has been described, is controlled by a control system shown in FIG. 5. In the figure, reference numeral 90 designates a central processing unit (hereinafter referred to as CPU), to which is connected data input means in the form of a keyboard 92. Also connected to the CPU 90 are a read only memory (hereinafter referred to as ROM) 94 and a random access memory (hereinafter called RAM) 96. The ROM 94 includes a program memory 98 storing programs shown in FIGS. 10, 11, 12A and 12B, and other programs for controlling the operation of the recording apparatus as a whole. The ROM 94 further includes a character pattern memory 100 which stores sets of character pattern data representative of patterns of the characters which are keyed in through keyboard 92, and a graphic pattern memory 102 which stores sets of graphic pattern data representative of graphic patterns which are designated through the keyboard 92.

Figure 6:
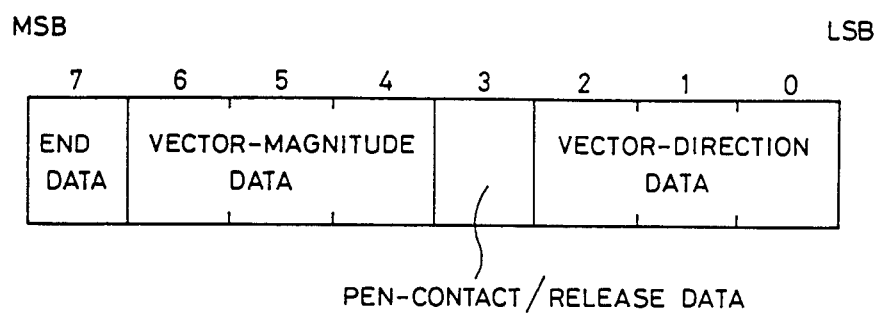
FIG. 6 is an illustration showing a byte of character pattern data stored in each memory location of a character pattern memory in a read only memory of the control system.
Figure 7:
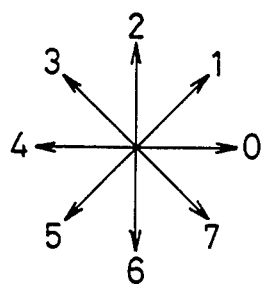
FIG. 7 is an illustration showing directions of a vector each of which is represented by vector-direction data illustrated in FIG. 6.
Figure 8:
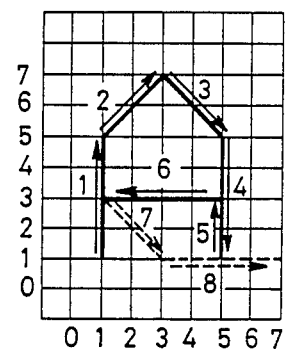
FIG. 8 is a view illustrating an example of a character written by the recording apparatus.

Each set of character pattern data representing a character comprises plural bytes each of which consists of eight bits as shown in FIG. 6, and corresponds to each element or segment of the character. As illustrated in FIG. 6, the low-order three bits (as counted from the least significant bit) are vector-direction data representative of a direction of a vector which defines the corresponding segment of the character. The next bit (fourth bit from LSB) is pen-contact/release data which indicates contact and release conditions of the selected pen 42 with respect to the sheet of paper 23. The next three bits are vector-magnitude data representative of a magnitude of the vector which corresponds to the length of the segment. The most significant bit (MSB) is end data which indicates whether the byte involved represents the last segment of the character, or not. Each vector representing each segment of a character may take one of eight directions as shown in FIG. 7, and has a magnitude selectable in eight steps (0 through 7) as depicted in FIG. 8. This latter figure illustrates, by way of example only, vectors defining six segments of letter "A" (segments 4 and 5 overlapping each other), and two dummy segments (indicated in broken line) which are not written (i.e., paths taken by the pen 42 in spaced-apart relation with the paper 23). An example of character pattern data for letter "A" are shown in Table 1.

TABLE 1

| Address No. | End Data 7(MSB) | Vector Magnitude Data | | | Pen-Contact Release Data | Vector Direction Data | | |
|---|---|---|---|---|---|---|---|---|
| | | 6 | 5 | 4 | 3 | 2 | 1 | 0 |
| 1 | 0 | 1 | 0 | 0 | 1 | 0 | 1 | 0 |
| 2 | 0 | 0 | 1 | 0 | 1 | 0 | 0 | 1 |
| 3 | 0 | 0 | 1 | 0 | 1 | 1 | 1 | 1 |
| 4 | 0 | 1 | 0 | 0 | 1 | 1 | 1 | 0 |
| 5 | 0 | 0 | 1 | 0 | 1 | 0 | 1 | 0 |
| 6 | 0 | 1 | 0 | 0 | 1 | 1 | 0 | 0 |
| 7 | 0 | 0 | 1 | 0 | 0 | 1 | 1 | 1 |
| 8 | 1 | 1 | 0 | 0 | 0 | 0 | 0 | 0 |

As shown in the table, the set of pattern data for letter "A" consists of eight bytes, six bytes of which represent The six actually written segments, and the remaining two bytes of which represent the above-indicated dummy segments. In this connection, it is noted that the end of stroke for writing the letter is indicated in the last byte of the character pattern data.

In the meantime, the graphic pattern memory 102 stores sets of graphic pattern data representative of basic graphic patterns of various kinds of graphs such as circular, broken-line and bar graphs. Since these basic graphic patterns are well known and used for common pen-recording or plotting apparatus, no further description thereof will be provided herein, except that up to twelve numerical values are graphically presented.

The RAM 96 includes: an input buffer memory 104 for temporarily storing coded data which are keyed in through the keyboard 92; a text memory 106 for storing a relatively large batch of keyed-in coded data entries; a display buffer memory 108 for storing coded data for the characters to be displayed on a liquid crystal display which will be described; a record buffer memory 110 for temporarily storing coded data for the characters to be recorded by the instant apparatus; a graph memory 112 for storing numerical data which are used in combination with the appropriate set of graphic pattern data stored in the graphic pattern memory 102, to provide a desired graphical presentation of the corresponding numerical values; and other memories. The RAM 96 further includes: a mode flag register 114 for setting a flag to establish a WRITING mode; a graph register 116 for setting a flag to select a desired one of the basic graphic patterns; an end flag register 118 used in recording the characters; a pen-contact flag register 120; a vector-direction register 122; a vector-magnitude register 124; and a size flag register 126 for setting a flag to select one of three sizes (large, medium and small) of the characters and graphs available on the recording apparatus.

There are also connected to the CPU 90 a paper feed driver circuit 130, a carriage driver circuit 132, a pen actuator driver circuit 134, and a display driver circuit 136, to which are respectively connected the platen drive motor 18, carriage drive motor 36, solenoid 74, and a liquid crystal display 170 which will be described.

Figure 9:
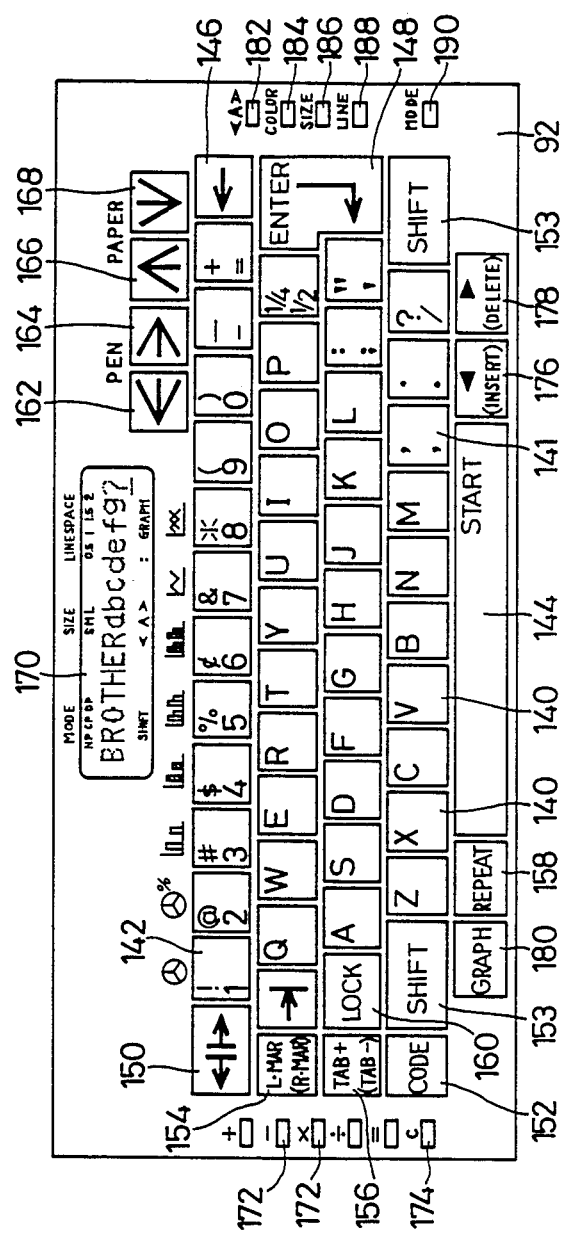
FIG. 9 is a plan view of a keyboard of the recording apparatus.

The previously described recording mechanism of the apparatus is located in the rear part of the apparatus, while the keyboard 92 forms the front part. The arrangement of keys on the keyboard 92 is shown in FIG. 9. Like a keyboard used for ordinary typewriters known in the art, the keyboard 92 provides a multiplicity of character keys such as alphabetic keys 140, symbol keys 141 and numeral keys 142, and further provides function keys such as a space key (bar) 144, a backspace key 146, a carriage return key 148, a tab key 150, a code key 152, a shift key 153, a margin set key 154, a tab set key 156, a repeat key 158, and a lock key 160. The margin set key 154 sets a left margin position when depressed alone, but sets a right margin position when depressed simultaneously with the code key 152. The tab set key 156 functions as a tab reset key when used in conjunction with the code key 152. Reference numerals 162 and 164 designate carriage-jog keys for moving the pen 142 to the left and to the right, respectively. Similarly, reference numerals 166 and 168 designate platen-jog keys for feeding the sheet of paper 23 upward and downward (toward its leading and trailing edges), respectively.

The previously indicated liquid crystal display 170, which is located in a rear central part of the keyboard 92, has a 15-digit capacity. As the character keys are operated successively, the corresponding characters are displayed on the display 170 while the already displayed characters are sequentially shifted to the left from one position to the next. The display 170 is capable of indicating an arithmetic statement given by operands and an operator or operators which are keyed in with the numeral keys 142, and arithmetic symbol keys 172 (addition, subtraction, multiplication, division and equality keys) which are disposed on the left-hand side end of the keyboard 92. A cancel key 174 below the equality key 172 is also used in keying in arithmetic data. The result of an arithmetic or mathematical operation defined by the given statement is also displayed on the liquid crystal display 170. While the characters are displayed on the display 170, it is possible to correct or edit the displayed data or statement by using an insert key 176 and a delete key 178 together with the appropriate character keys. To use these insert and delete keys 176, 178 for inserting and deleting purposes, however, they should be operated simultaneously with the code key 152. When the insert key 176 or delete key 178 is operated alone, it serves as a symbol key.

The keyboard 92 further comprises a GRAPH key 180 which serves as a mode selector key for selecting a WRITING mode for writing characters, or a PLOTTING mode for plotting graphs. The GRAPH key 180 selects the WRITING and PLOTTING modes alternately upon repeated depression thereof. When the PLOTTING mode is selected by the GRAPH key 180, the display 170 provides an interrogating statement asking the operator to select one of the graphic patterns for circular, bar and broken-line graphs. In response to this interrogation, the operator presses the appropriate numeral keys 142 to select the desired graphic pattern.

At the right-hand side end of the keyboarad 92, there are disposed: a vector key 182 to select a first writing mode in which the characters are oriented in ordinary upright posture and written along a horizontal line from the left to the right of the paper 23, or a second writing mode in which the characters are oriented sideways and written along a vertical line from the top to the bottom or vice versa; a color selector key 184 for selecting the color of an ink of the ball-point pen 42 that is, for selecting one of the pens 42 of different colors; a size selector key 186 for selecting one of plural sizes of the characters and graphs to be inscribed; a line space selector key 188 for changing the line spacing, i.e., a distance of feed of the paper 23 upon carriage return; and a writing mode selector key 190 for selecting a specific mode while the WRITING mode is selected, i.e., for selecting a non-print mode, a correction print mode, or a direct print mode. In the non-print mode, it is possible to perform an arithmetic operation or store keyed-in data into the text memory 106, without recording the characters on the sheet of paper 23. In the correction mode, the recording of characters is effected after the display 170 is overflowed with the keyed-in characters. In this mode, it is possible to edit or correct the keyed-in characters as long as they are displayed, and before they are recorded on the paper 23, as previously indicated. In the direct print mode, the characters are recorded as they are keyed in.

Referring to FIGS. 10, 11, 12A and 12B, the operation of the recording apparatus with the aforementioned arrangement will be described.

Figure 10:
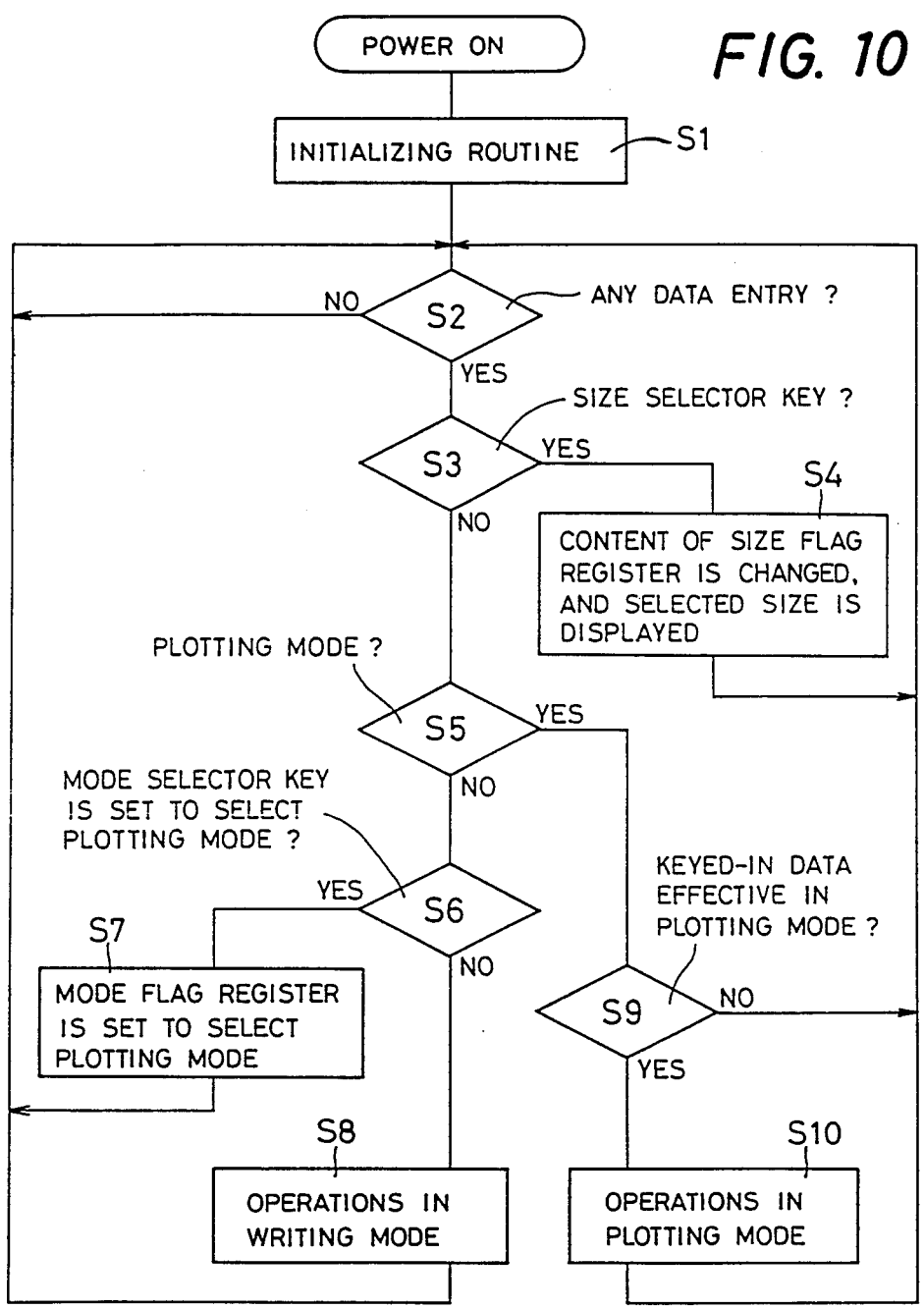
FIGS. 10, 11, 12A and 12B are flow charts representing a control program stored in the read only memory.

Upon application of power to the recording apparatus, the CPU 90 executes an initializing routine in step S1 as shown in FIG. 10. This initializing routine includes the resetting of all registers and counters, and the movement of the carriage 30 to the preset left margin position after it is once returned to its home position, as usually performed in an ordinary electronic typewriter. The mode flag register 114 is reset to select the normal WRITING mode, and the size flag register 126 is set to select the "medium" size. Subsequently, the CPU 90 goes to step S2, which is repeatedly executed to check if any key on the keyboard 92 is operated. When any data is entered through the keyboard 92, step S3 is executed to see if the data entry is the result of operation of the size selector key 186. If the judgement in step S3 is affirmative (YES), step S3 is followed by step S4 wherein the size is changed from "medium" to "large", that is, the content of the size flag register 126 is changed to select the "large" size. If the size selector key 186 is depressed one more time, the size is changed from "large" to "small". Similarly, the subsequent depression will change the size from "small" to "medium". Thus, the content of the size flag register 126 is changed from one of three predetermined states to another in sequence upon repeated depression of the size selector key 186. Further, letter "L", "M" or "S" indicative of the selected one of the three sizes "large", "medium" and "small" is displayed on the liquid crystal display 170. If the size selector key 186 is not operated, step S3 is followed by step S5 to check if the PLOTTING mode is selected or not. Since the CPU 90 is now placed in the WRITING mode as previously indicated, step S5 is followed by step S6 wherein the CPU 90 checks if the mode selector key (GRAPH) 180 has been operated or not. If the judgement in step S6 is affirmative (YES), the CPU 90 goes to step S7 wherein the mode flag register 114 is set to select the PLOTTING mode. In addition, the display 170 provides an indication to ask the operator to specify the desired graphic pattern, and displays letter "L", "M" or "S" to indicate the selected size. The CPU 90 then goes back to step S2. In the case where the judgement in step S6 reveals that the mode selector key 180 has not been activated, step S6 is followed by step S8 wherein a writing operation is performed, as will be described in detail.

If the PLOTTING mode is established in step S7 and any data entry is recognized in step S2, the judgement in step S5 becomes affirmative (YES), and the CPU 90 therefore goes to step S9 to check if the entered data is effective in the PLOTTING mode or not. While the recording apparatus is placed in the PLOTTING mode, it is impossible to effect the recording of characters such as alphabetic letters and symbols. For this reason, step S9 is taken to judge whether the current data entry represents any one of such characters keyed in through the keyboard 92, and to return the CPU 90 to step S2 if the data entry represents such a character. In this connection, it is appreciated that an alarming sound be generated or the display 170 provides an alarm indication, to inform the operator of erroneous data entry. If the judgement in step S9 is affirmative (if the entered data is effective in the PLOTTING mode), the CPU 90 goes to step S10 wherein a plotting operation is performed, as will be described in detail.

Figure 11:
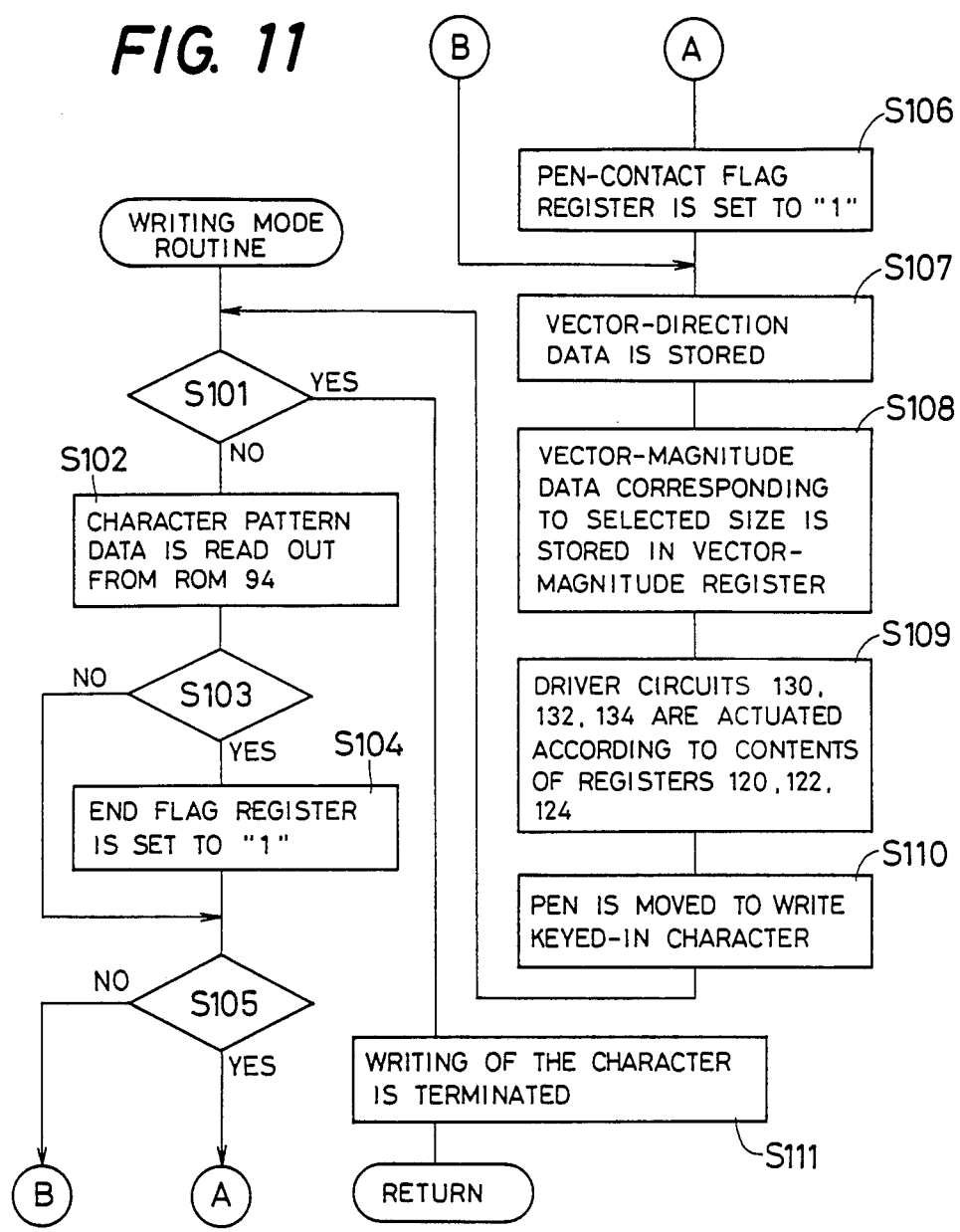

Referring next to FIG. 11, the WRITING mode of operation in step S8 of FIG. 10 will be described. The routine in the WRITING mode begins with step S101 wherein the CPU 90 checks if the end flag register 118 is set to "1" or not. In this initial stage, the end flag has not yet been established, the judgement in Step 101 is negative (NO) and the CPU 90 goes to the next step S102. In this step S102, the CPU 90 reads out from the character pattern memory 100 of the ROM 94 the individual bytes of a set of character pattern data which corresponds to the first keyed-in data (representative of the first character to be written). In the next step S103, the CPU 90 checks if the current byte of the read-out character pattern data is the last byte of that data. In this point of time, the judgement in step S103 is negative (NO). Consequently, the CPU 90 goes to step S105.

In step S105, the CPU 90 judges whether the pen-contact/release data in the read-out byte of the character pattern data represents the contact of the selected pen 42 with the paper 23, or the release from the paper 23. If the judgement is affirmative (YES), step S105 is followed by step S106 wherein the pen-contact flag is set, that is, the pen-contact flag register 120 is set to "1". If the judgement in step S105 is negative (NO), the CPU 90 skips step S106 to step S107. In this step S107, the CPU 90 stores in the vector-direction register 122 the vector-direction data of the read-out set of character pattern data, which represents the direction of a vector defining a segment of the character which is represented by the read-out data. Then, the CPU 90 goes to step S108 wherein the vector-magnitude data corresponding to the selected size is stored in the vector-magnitude register 124. Described in more detail, each vector-magnitude data stored in the character pattern memory 100 represents the length of each segment of a character which corresponds to the "small" size. When the size flag register 126 is set at the "small" size, the vector-magnitude data stored in the character pattern data memory 100 is stored in the vector-magnitude register 124, without modification thereof. However, if the size flag register 126 is set to select the "medium" size, the vector-magnitude data stored in the memory 100 is modified by multiplying the magnitude of the vector by two, and the thus modified vector-magnitude data representing the doubled magnitude is stored in the vector-magnitude register 124. Similarly, when the "large" size is selected, the vector magnitude represented by the vector-magnitude data in the memory 100 is multiplied by four, and the thus modified vector-magnitude data is stored in the vector-magnitude register 124. As indicated above, the "medium" size is two times as large as the "small" size, and the "large" size is two times as large as the "medium" size, i.e., four times as large as the "small" size.

Subsequently, step S109 is executed to supply the paper feed, carriage and pen actuator driver circuits 130, 132, 134 with drive signals corresponding to the contents of the vector-direction register 122, vector-magnitude register 124 and pen-contact flag register 120. As a result, the platen drive motor 18 and the carriage drive motor 36 are operated while the pen actuator solenoid 74 is energized or deenergized, in step S110, so as to cause relative movements between the selected pen 42 and the sheet of paper 23. Thus, the pen 42 is moved relative to the paper 23 to write the first segment (stroke) of the keyed-in character which corresponds to the first byte of the character pattern data, with a length corresponding to the selected size, or to take a first path (dummy segment) without contact of the pen 42 with the paper 23. Subsequently, the CPU 90 goes back to step 101, and the steps of operations which have been described are repeated. In this manner, all segments of the keyed-in character are written on the paper 23.

When the last byte of the appropriate set of character pattern data is read by the CPU 90, the judgement in step S103 becomes affirmative (YES) because the content of the most significant bit of the last byte represents the end of the character pattern data (end of the writing operation of the character). Hence, step S103 is followed by step S104 wherein the end flag register 118 is set to "1". Successively, the CPU 90 executes steps S105 through S110 in the same way as in executing the preceding bytes of the character pattern data. Finally, the CPU 90 goes back to step S101 in which the affirmative (YES) judgement is obtained since the end flag register 118 has been set to "1". Consequently, step S101 is then followed by step S111 to reset the registers such as the vector-direction register 122, vector-magnitude register 124, pen-contact flag register 120 and end flag register 118. Upon completion of step S111, the CPU 90 returns to step S2 of FIG. 10 and becomes ready to receive the next data entry through the keyboard 92.

Figure 12A:
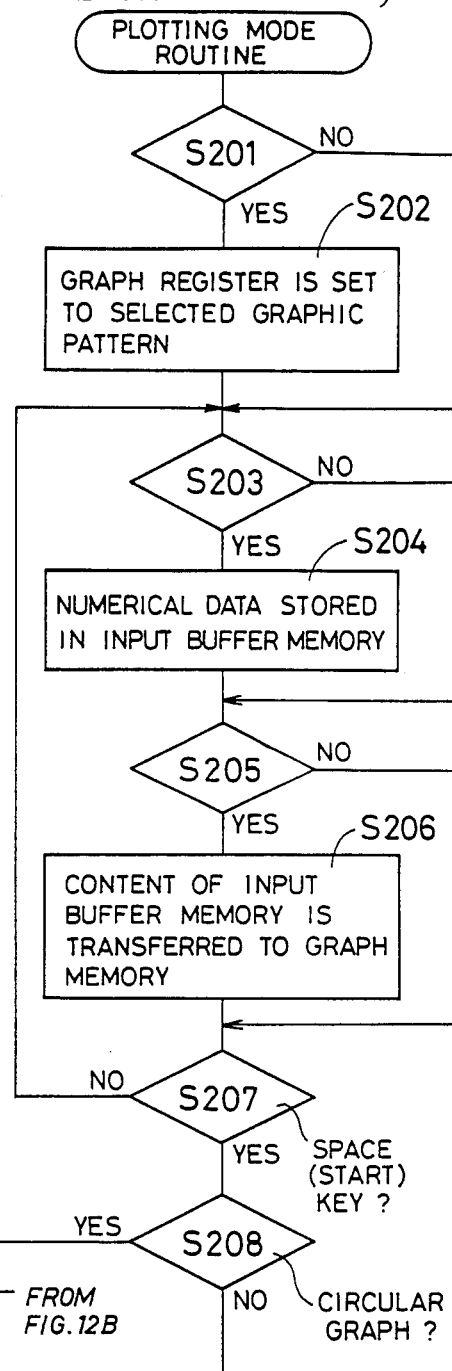
Figure 12A:
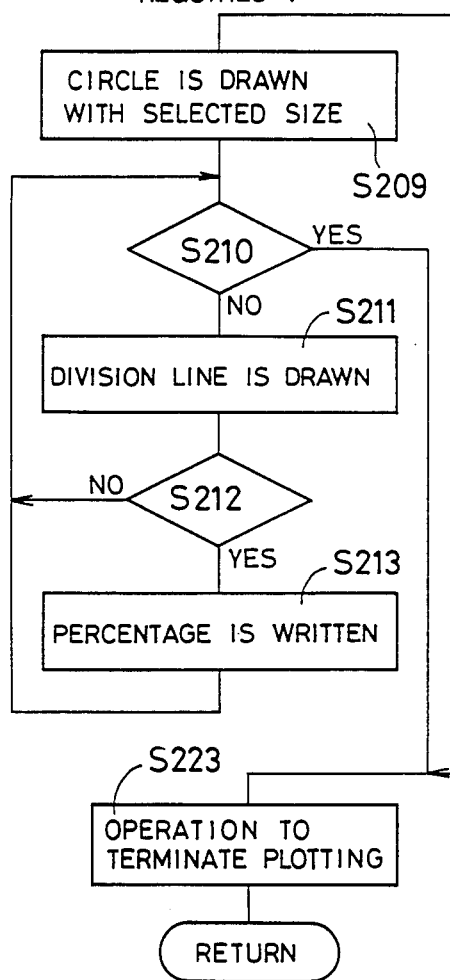
Figure 12B:
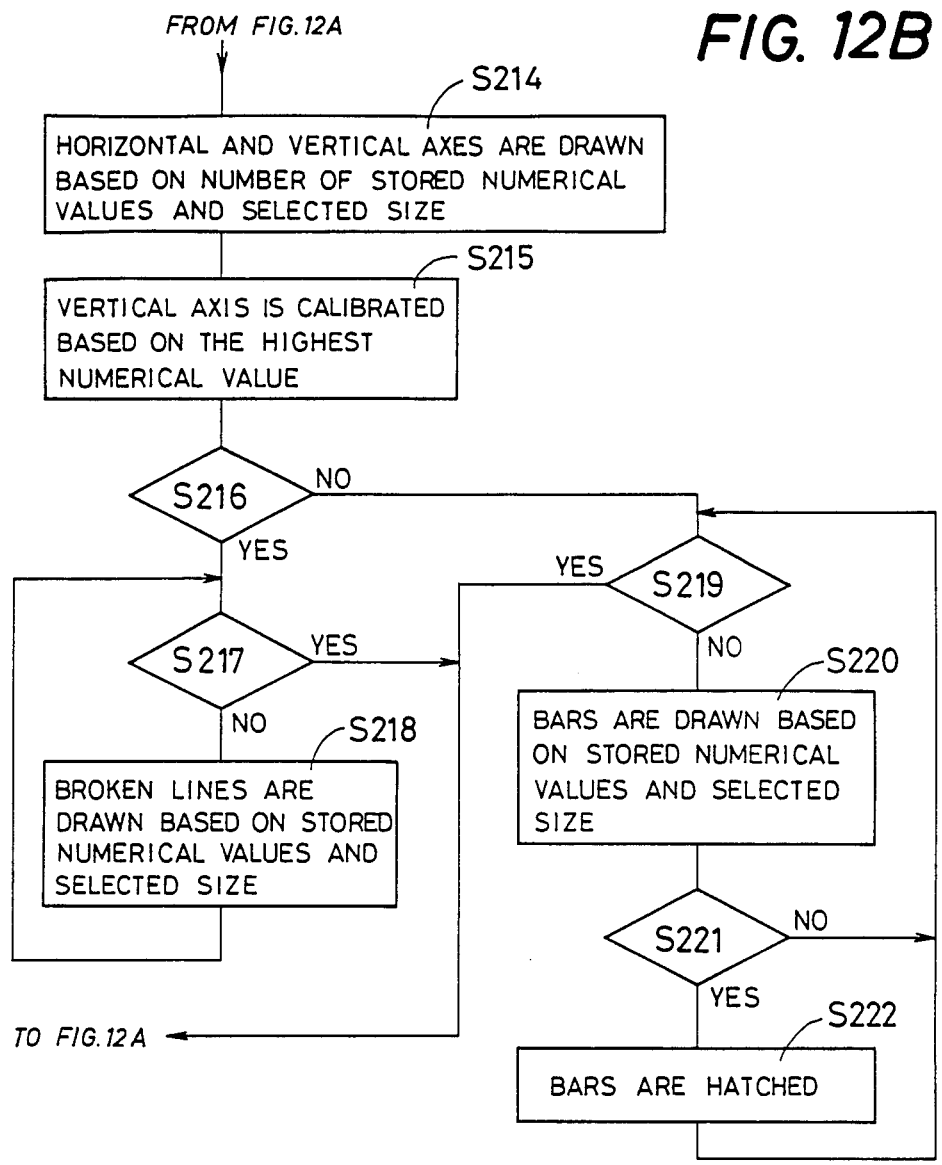

Then, the PLOTTING mode of operation of step S10 of FIG. 10 will be described, referring to FIGS. 12A and 12B. This PLOTTING mode of operation starts with step S201 to first check whether any graphic pattern selection data has been entered or not, that is whether any numeral key 142 has been operated after the PLOTTING mode has been established. If the judgement in step S201 is affirmative, step S201 is followed by step S202 wherein the graph register 116 is set to the graphic pattern selected by the appropriate numeral key 142. In the event that the keyed-in data is not any graphic pattern selection data (the operated key is not any one of the numeral keys 142), step S201 is immediately followed by step S203 wherein the CPU 90 checks if any numeral key 142 has been operated after any graphic pattern is selected. If the judgement in step S203 is affirmative (YES), the CPU 90 goes to the next step S204 to store the corresponding numerical data in the input buffer memory 104. If the negative judgement is obtained in step S203, the CPU 90 skips step S204 to step S205 to check if the "ENTER" key has been activated, viz., whether the carriage return key 148 has been operated in the PLOTTING mode. If the carriage return key 148 has been operated, step S205 is followed by step S206 in which the numeric data stored in the input buffer memory 104 is transferred to the graph memory 112. If the judgement in step S205 is negative (NO), the CPU 90 skips step S206 and goes to step S207 to check whether the START key has been activated, i.e., whether the space key 144 has been operated in the PLOTTING mode. The negative judgement in step S207 will cause the program to return to step S203. Described more specifically, if the two appropriate numeral keys 142 are operated to enter a desired two-digit numerical value and the ENTER key 144 is operated, the numerical data representative of the keyed-in two-digit value is stored in the graph memory 112. In the same manner, up to twelve numerical values that are presented in a graph can be stored in the graph memory 112.

After a desired graphic pattern has been selected and the numerical values for the graph have been entered as explained above, the START key 144 is operated. Consequently, the judgement in step S207 becomes affirmative (YES), and the CPU 90 goes to step S208 to check if the content of the graph register 116 designates a circular graph (pie chart). If a circular graph pattern is set in the graph register 116, step S208 is followed by step S209 wherein a circle is drawn with a diameter corresponding to the size selected by the size selector key 186. Described more particularly, when the selected size is "small", drive signals corresponding to the graphic pattern data stored in the graphic pattern memory 102 are applied to the paper feed drive circuit 130 and the carriage drive circuit 132 to draw a circle with the predetermined smallest diameter. When the "medium" size is selected, the paper feed and carriage drive circuits 130, 132 are supplied with the drive signals corresponding to the read-out graphic pattern data multiplied by two, whereby a circle is drawn with a diameter two times as large as that of the circle corresponding to the "small" size. Similarly, when the "large" size is selected, a circle is drawn with a diameter four times as large as that of the circle of the "small" size. Then, the CPU 90 goes to step S210 to check if all of the numerical data in the graph memory 112 have been presented in the selected graphic pattern, i.e., in the circular graph. Since this judgement is negative (NO) at this stage of operation, step S211 is executed wherein the CPU 90 reads out from the graph memory 112 the first set of numerical data, and calculates a percentage of the value of the read-out first numerical data with respect to the total sum of the values of all sets of numerical data stored in the graph memory 112. Based on the calculated percentage, radial lines dividing the circle are drawn to indicate the calculated percentage of the first numerical value. Obviously, the length of the division lines is determined corresponding to the selected size of the graph. Successively, the CPU 90 goes to step S212 to check if the indication of percentage of the numerical values is required or not. In the case where the selected graphic pattern is drawn with percent indication, step S212 is followed by step S213 wherein the percentage of the first numerical value is written in the circular graph. If the selected graphic pattern is not accompanied with percent indication, step S213 is not executed and the control 90 goes back to step S210. In the same manner, the second and subsequent numerical values stored in the graph memory 112 are indicated by dividing the circle with radial division lines which are drawn one after another based on the individual numerical values with respect to the total sum. After all of the numerical data stored in the graph memory 112 have been presented in the form of a circular graph as described above, the judgement in step S210 becomes affirmative (YES), the CPU 90 goes to step S223 to terminate the plotting operation to draw the circular graph, that is, to clear the graph memory 112, return the ball-point pen 42 to the home position and perform other terminating steps.

In the case where the judgement in step S208 is negative (NO), viz., where the graph to be plotted is a broken-line or bar graph, the CPU 90 goes to step S214 wherein horizontal and vertical axes of the graph are drawn whose lengths are determined based on the number of the numerical values in the graph memory 112 and on the selected size. In the next step S215, the vertical axis (ordinate) is calibrated based on the maximum numerical value stored in the graph memory 112, and the calibrations are written along the vertical axis. Step S215 is followed by step S216 in which the CPU 90 checks if the graph to be plotted is a broken-line graph. If the judgement in step S215 is affirmative, step S217 is executed to check if all of the numerical data in the graph memory 112 have been presented in a broken-line graph. If this judgement is negative, step S218 is executed to draw a broken line according to the numerical value read out from the graph memory 112 and on the selected size. When all of the numerical values in the graph memory 112 have been presented as the broken-line graph, the judgement in step S217 becomes affirmative and consequently the CPU 90 goes to step S223 to terminate the cycle of plotting the broken-line graph.

In the case where the judgement in step S216 is negative (NO), that is, if the graph to be plotted is a bar graph, step S219 is executed to check if all of the numerical values in the graph memory 112 have been presented in a bar graph. Then, the CPU 90 goes to step S220 in which a bar is plotted according to the first numerical value stored in the graph memory 112 and the selected size. After the bar has been plotted based on the first numerical data, step S221 is performed to check if the graphic pattern designated by the graph register 116 is hatched or not. If a hatched bar graph is selected, step S222 is executed to hatch the bar drawn in step S220. If the bar graph is not hatched, the CPU 90 skips step S222 and returns to step S219. When all bars representing all numerical values in the graph memory 112 have been plotted with the above steps repeated, the judgement in step S219 becomes affirmative and the CPU 90 executes step S223 to terminate the plotting of the bar graph. Then, the CPU 90 returns to step S2 of FIG. 10.

As described above, a circular, broken-line or bar graph is plotted. When it is required to plot another graph, a desired graphic pattern is selected and the size of the graph is selected if it is required to change the size. Then, appropriate numerical values are keyed into the graph memory 112. Thus, the new graph is drawn following the preceding graph. When it is desired to write characters after a graph or graphs have been plotted, the mode selector key (GRAPH key) 180 is activated to reset the mode flag register 114 to the WRITING mode. Subsequently, the pen 42 is moved to a suitable position, and desired characters are entered as in an ordinary typing operation. Thus, the entered characters are written with the pen 42 as previously described. It is noted that the WRITING mode is selected for writing characters necessary to identify the graph or indicate the meanings of numerical data represented by the graphs.

As is apparent from the foregoing description, the instant recording apparatus is capable of recording both characters and graphs with the selected ball-point pens 42, selectively in the WRITING and PLOTTING modes, by entering appropriate data through the keyboard 92. Thus, the recording apparatus is capable of easily preparing a document which includes a graph or graphs. Further, the characters and graphs are both recorded in one of three different sizes "small", "medium" and "large", which are readily selectable with a common size selector key 186.

While the present invention has been described in its preferred embodiment for illustrative purpose only, it is to be understood that the invention is not limited thereto, and that various changes and modifications in the recording mechanism, control system and control programs of the recording apparatus may occur to those skilled in the art within the scope of the invention defined in the appended claims.

We claim:

1. An integral writing/plotting recording apparatus, comprising:
    a main housing;
    a keyboard mounted to said main housing and having character keys corresponding to characters, function keys, and mode selecting means for selecting one of a writing mode and a plotting mode, said character keys including letter keys corresponding to letters, and numeral keys corresponding to numerals, said function keys including a start key;
    a paper feeding device mounted to said housing for feeding a sheet of paper;
    a carriage mounted to said housing for supporting a writing instrument, such that the carriage is movable in a direction substantially perpendicular to a feeding direction of said sheet of paper;
    a carriage driving device for reciprocating said carriage in said substantially perpendicular direction;
    a writing-instrument driving device for moving said writing instrument between a first position in which the writing instrument is in contact with said sheet of paper, and a second position in which the writing instrument is held away from the sheet of paper;
    a character pattern memory within said housing for storing sets of character data representative of patterns of said characters;
    a graphic pattern memory within said housing for storing sets of graphic pattern data respectively representative of a plurality of graphic patterns selected from the group consisting of a bar graph, a broken-line graph and a circular graph, said plurality of graphic patterns being selected by said numeral keys;
    a graph memory within said housing for storing numerical graph data which is entered through said numeral keys and which is plotted in the selected graphic pattern; and
    control means within said housing for receiving input data from said keys and mode selecting means of said keyboard and controlling said paper feeding device, carriage driving device and writing-instrument driving device, responsive to said input data including said numerical graph data, according to the following steps:
    (a) waiting for entry of first input data through said keyboard;
    (b) determining if the apparatus is already in said plotting mode;
    (c) if the apparatus is not already in said plotting mode, determining if said mode selecting means has been operated to select said plotting mode and, if so, establishing said plotting mode;
    (d) when said first input data is entered, and if the apparatus is already in said plotting mode or if said plotting mode has been established by said mode selecting means, checking if the first input data is a first set of numerical data entered through at least one of said numeral keys and, if so, reading in from said graphic pattern memory the set of graphic pattern data which corresponds to a graphic pattern designated by said first set of numerical data;
    (e) when second input data is entered after said first set of numerical data has been entered, checking if the second input data is another set of numerical data and, if so, storing said another set of numerical data as said numerical graph data in said graph memory;
    (f) repeating step (e) until said start key has been operated;
    (g) if said start key has been operated in said plotting mode, controlling said paper feeding device, said carriage driving device and said writing-instrument driving device to print a graph according to the set of graphic pattern data which has been read in, and said numerical graph data stored in said graph memory; and
    (h) if the apparatus is not already in said plotting mode, and if said mode selecting means has not been operated to select said plotting mode, performing in a writing mode by reading in from said character pattern memory the sets of character pattern data corresponding to the character keys operated, and controlling said paper feeding device, carriage driving device and writing-instrument driving device so as to print said characters on said sheet of paper.

2. The recording apparatus of claim 1, wherein said keyboard further comprises size selecting means for determining a size of said characters and said graph, and which further comprises converter means which receives from said control means drive signals corresponding to said read-out character and graphic pattern data, and converting said drive signals into converted drive signals based on the size determined by said size selecting means, said converting means applying said converted drive signals to said paper feeding and carriage driving devices.

3. The recording apparatus of claim 1, wherein said mode selecting means comprises a single selector key which selects said writing and plotting modes alternately upon repeated depression thereof.

4. The recording apparatus of claim 3, further comprising a mode flag register, said selector key switching a content of said mode flag register between two predetermined states alternately upon repeated depression of the selector key.

5. The recording apparatus of claim 2, wherein said size selecting means comprises a single selector key which selects one of plural sizes upon repeated depression thereof.

6. The recording apparatus of claim 5, further comprising a size flag register, said selector key changing a content of said size flag register from one of plural predetermined states to another in sequence upon depression of the selector key.

7. The recording apparatus of claim 6, wherein said single selector key and said size flag register are commonly used for determining the sizes of said characters and said graph.

8. The recording apparatus of claim 2, wherein each of said sets of character pattern data comprises vector data representating each element of each of said characters as a vector having a magnitude and a direction, and further comprises pen-contact/release data for contact and release of the writing instrument with respect to the sheet of paper.

9. The recording apparatus of claim 8, wherein said converter means converts said drive signals to said converted drive signals by multiplying the magnitude of said vector by one of plural predetermined values which is determined by the size determined by said size selecting means, one of said predetermined values corresponding to a standard size of the characters and graph.

10. The recording apparatus of claim 9, wherein said plural predetermined values consists of said one value, a second value two times as large as said one value, and a third value four times as large as said one value.

11. The recording apparatus of claim 8, wherein said size selecting means has a standard position corresponding to a standard size of the characters and graph, and said converter means does not convert said drive signals when said size selecting means is placed in said standard position, said converter means converting said drive signals to said converted drive signals, when said selecting means is placed in a position other than said standard position, by multiplying the magnitude of said vector by a value determined by said position in which the selecting means is placed.

12. The recording apparatus of claim 8, wherein said keyboard comprises a vector direction key for changing a posture of said characters from a standard posture thereof determined by said character pattern data stored in said character pattern memory, and which further comprises another converter means for converting the direction of said vector according to the operation of said vector direction key.

13. The recording apparatus of claim 1, wherein said character keys include keys corresponding to numerals, and said graphic data is input through said numeral keys.

14. An integral writing/plotting recording apparatus, comprising:

a main housing;

a keyboard mounted to said main housing and having character keys corresponding to characters, function keys, and mode selecting means for selecting one of a writing mode and a plotting mode, said character keys including letter keys corresponding to letters, and numeral keys corresponding to numerals, said function keys including a start key;

a paper feeding device mounted to said housing for feeding a sheet of paper;

a carriage mounted to said housing for supporting a writing instrument, such that the carriage is movable in a direction substantially perpendicular to a feeding direction of said sheet of paper;

a carriage driving device for reciprocating said carriage in said substantially perpendicular direction;

a writing-instrument driving device for moving said writing instrument between a first position in which the writing instrument is in contact with said sheet of paper, and a second position in which the writing instrument is held away from the sheet of paper;

a character pattern memory within said housing for storing sets of character data representative of patterns of said characters;

a graphic pattern memory within said housing for storing sets of graphic pattern data respectively representative of a plurality of graphic patterns selected from the group consisting of a bar graph, a broken-line graph and a circular graph, said plurality of graphic patterns being selected by a group of said character keys;

a graph memory within said housing for storing graph data which is entered through said group of character keys and which is plotted in the selected graphic pattern; and control means within said housing for receiving input data from said keys and mode selecting means of said keyboard and controlling said paper feeding device, carriage driving device and writing-instrument driving device, responsive to said input data including said graph data, according to the following steps:

(a) waiting for entry of first input data through said keyboard;

(b) determining if the apparatus is already in said plotting mode;

(c) if the apparatus is not already in said plotting mode, determining if said mode selecting means has been operated to select said plotting mode and, if so, establishing said plotting mode;

(d) when said first input data is entered, and if the apparatus is already in said plotting mode or if said plotting mode has been established by said mode selecting means, checking if the first input data is a first set of character data entered through at least one of said group of character keys and, if so, reading in from said graphic pattern memory the set of graphic pattern data which corresponds to a graphic pattern designated by said first set of character data;

(e) when second input data is entered after said first set of character data has been entered, checking if the second input data is another set of character data and, if so, storing said another set of character data as said graph data in said graph memory;

(f) repeating step (e) until said start key has been operated;

(g) if said start key has been operated in said plotting mode, controlling said paper feeding device, said carriage driving device and said writing-instrument driving device to print a graph according to the set of graphic pattern data which has been read in, and said graph data stored in said graph memory; and (h) if the apparatus is not already in said plotting mode, and if said mode selecting means has not been operated to select said plotting mode, performing in a writing mode by reading in from said character pattern memory the sets of character pattern data corresponding to the character keys operated, and controlling said paper feeding device, carriage driving device and writing-instrument driving device so as to print said characters on said sheet of paper.

* * * * *